United States Patent [19]

Kalinoski et al.

[11] Patent Number: 4,470,313
[45] Date of Patent: Sep. 11, 1984

[54] MECHANICALLY EXCITED RESONANT-ELEMENT SENSOR

[75] Inventors: Richard W. Kalinoski, East Providence, R.I.; George E. Sgourakes, Millis; Duane Thompson, Franklin, both of Mass.

[73] Assignee: The Foxboro Company, Foxboro, Mass.

[21] Appl. No.: 365,678

[22] Filed: Apr. 5, 1982

[51] Int. Cl.³ .............................................. G01L 1/10
[52] U.S. Cl. ............................ 73/862.59; 73/DIG. 1
[58] Field of Search .... 73/DIG. 1, 517 AV, 579–581, 73/704, 778, 862.41, 862.59; 324/80; 331/65, 156, 165

[56] References Cited

U.S. PATENT DOCUMENTS

| | | |
|---|---|---|
| 3,393,565 | 7/1968 | Klee . |
| 3,486,369 | 12/1969 | Korzilius ............................ 73/580 |
| 4,257,010 | 3/1981 | Bergman et al. . |
| 4,345,482 | 8/1982 | Adolfsson et al. ............... 73/862.59 |
| 4,379,226 | 4/1983 | Sichling et al. ................ 73/DIG. 1 |

Primary Examiner—Charles A. Ruehl
Attorney, Agent, or Firm—Jack H. Wu

[57] ABSTRACT

A resonant wire instrument for producing a measurement signal, which is derived from the resonant frequency of a vibratable wire tensioned in accordance with the magnitude of a physical variable being measured, wherein a force impulse produced mechanically by an apparatus is applied to displace laterally one end of the vibratable wire so as to excite the wire into resonant motion. In one embodiment, the one end is rigidly attached to a housing and a piston applies a transverse force impulse to that end by momentarily striking the housing. In another embodiment, the one end is connected to a piezoelectric crystal which responds to a short-duration electric field to displace momentarily that end. In one species of this other embodiment, the crystal is made to oscillate at the resonant frequency of the tensioned wire by the application of an alternating-polarity voltage signal that is generated by a voltage source having an output connected to the crystal, and a feedback circuit coupled to receive the measurement signal operates to produce a control signal that is used for controlling the voltage source so that the voltage signal being applied to the crystal has a frequency which varies in accordance with changes in the resonant frequency of the wire.

12 Claims, 4 Drawing Figures

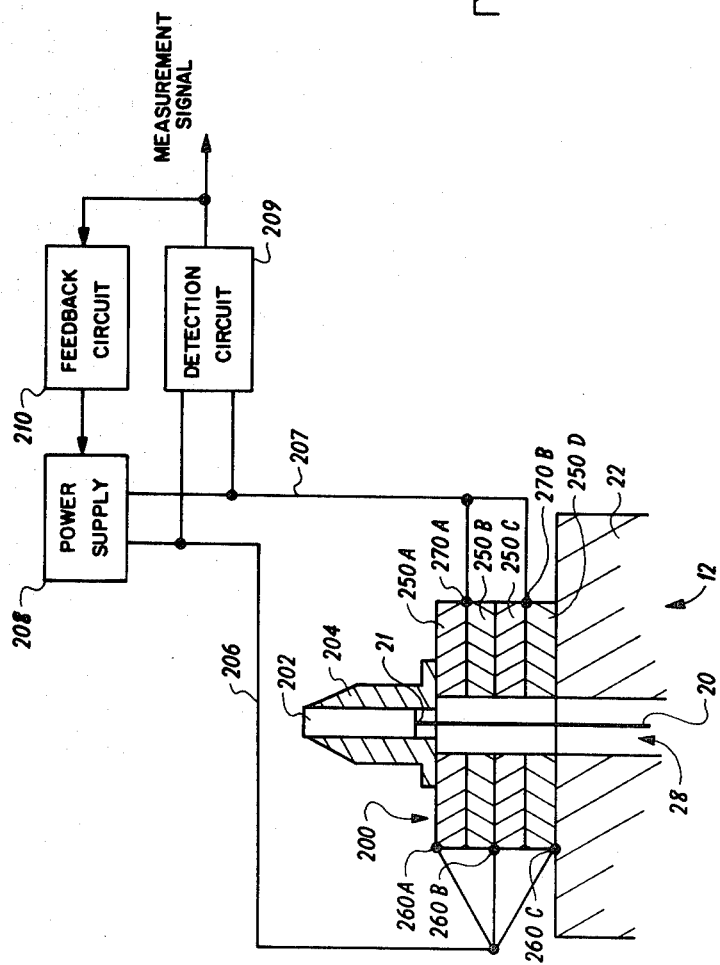

MECHANICALLY EXCITED RESONANT-ELEMENT SENSOR

BACKGROUND OF THE INVENTION

1. Field of the Invention

This invention relates generally to resonant-element instruments that measure a physical variable representative of an industrial process condition. More particularly, this invention relates to an apparatus for exciting the resonant element into vibratory motion.

2. Description of the Prior Art

It has been well known for many years that the resonant vibrational frequency of a taut wire is a function of the tension being applied to that wire. It was also long recognized that if an industrial process condition is converted to a force and applied to an instrumentality such as a diaphragm or bellows which holds the wire in tension, then a measurement signal representing the magnitude of the process condition can be produced by causing the wire to vibrate and using the detected frequency of vibration to generate the measurement signal.

In some of the prior art instruments, the vibratory wire was formed of a magnetic material. That wire having wire ends clamped in place was made to vibrate via the influence of an alternating magnetic field produced by an electromagnetic drive coil. Detection of the frequency of wire vibration was usually by a pickup coil that was inductively or capacitively coupled to the wire. The pickup coil produced a voltage signal having variations that corresponded to the frequency of wire vibrations. As is well known, both drive and pickup coils were disposed closely adjacent the wire not only for positioning the wire in a region of high magnetic field intensity but also for obtaining a relatively large magnitude voltage signal from the pickup coil.

In other prior art instruments, the wire was made of an electrically conductive material and was immersed in a strong magnetic field produced by permanent magnets. When an oscillating current flowed through the wire, the magnetic field interacted with that current and caused the wire to be displaced back and forth from its rest position. By advantageously controlling the frequency of the oscillating current, the wire displacements were sustained at the resonant frequency of the wire. An electronic oscillator that develops the alternating current for maintaining wire vibrations at the resonance frequency of the taut wire is known and is disclosed, for example, in U.S. Pat. No. 4,118,977 issued to Olsen et al entitled, "Electrical Signal Transmitter for Vibrating-Wire Sensor."

Although the prior art instruments described above have performance abilities suited for their intended purposes, these instruments have limitations when used in certain applications. Specifically, having electrical currents in an hazardous environment may dictate that expensive casings are required to contain the electrically active devices so as to prevent disasters such as an explosion. There is also the problem of sealing the electrical and signal leads that must be routed through each of the casings for connection to the drive and pickup coils or to the electrically-conductive wire of the respective instruments described above.

Furthermore, in the instruments of the type having permanent magnets, materials such as samarium cobalt are often used for producing a strong and intense magnetic field about the vibrating wire. However, these materials are expensive and their costs are a substantial part of the costs for producing this type of instrument. Additionally, the permanent magnets are usually joined to pole pieces which have specially-configured faces that concentrate the magentic field into a small region about the wire. But production costs are again increased because of not only the added costs for making these pole pieces but also the additional assembly steps of aligning the pole pieces to have a narrow gap between one another and locating those faces closely adjacent the wire.

Therefore, in view of the above, there is a need for an improved resonant element instrument which utilize neither coils nor magnets for producing vibratory motion.

SUMMARY OF THE INVENTION

The above mentioned limitations of prior art instruments are overcome by the provision of a new and improved resonant element instrument made in accordance with the teachings of the present invention wherein an apparatus, coupled to the one end of a vibratable wire, is arranged for producing mechanically a force impulse which displaces that wire end and thereby excites the wire into resonant motion.

In one embodiment of the present invention, the apparatus includes a mechanically operated impulsing device mounted to the instrument housing to which the one end of the wire is rigidly connected. The impulsing device operates to induce wire vibrations by momentarily striking the housing thus producing a force impulse which is transmitted to the wire end. In one species of this embodiment of the present invention, the impulsing device is a pneumatically driven piston. This invention when incorporated with a fiber optic detection means, such as disclosed as U.S. patent application Ser. No. 350,687, filed on behalf of Gilby et al, does not use electrical currents and is therefore inherently safe for applications in most hazardous environments. Moreover, the need for the expensive casing used in some prior art instruments is eliminated along with the problems associated with routing and sealing electrical leads through that casing.

In another embodiment of the present invention, a piezoelectric crystal is formed around the wire end. A power supply of conventional design is connected to the crystal and operates to produce short-duration voltage pulses. The crystal responds to each voltage pulse by suddenly changing shape such that the wire end connected to the crystal is displaced laterally with respect to the direction of the tensioning force being applied to the wire. This sudden displacement acts to excite the wire into vibratory motion.

It can be understood from the above that resonant-element instruments incorporating either embodiment of the present invention do not require permanent magnets and are therefore simpler and less costly to manufacture than prior art instruments made with permanent magnets and associated assemblies.

The above and other features of the present invention will be more fully understood from a reading of the ensuing detailed description of the preferred embodiments given with reference to the appended drawings.

BRIEF DESCRIPTION OF THE DRAWINGS

FIG. 3 is a sectional plan view showing a portion of one species of the present invention wherein the piezoelectric crystal depicted in FIG. 2 is formed with stacked layers.

FIG. 4 is a sectional plan view showing a portion of another species of the present invention depicted in FIG. 2 wherein the piezoelectric crystal is formed in a bimorph arrangement.

DESCRIPTION OF THE PREFERRED EMBODIMENTS

Figure 1:
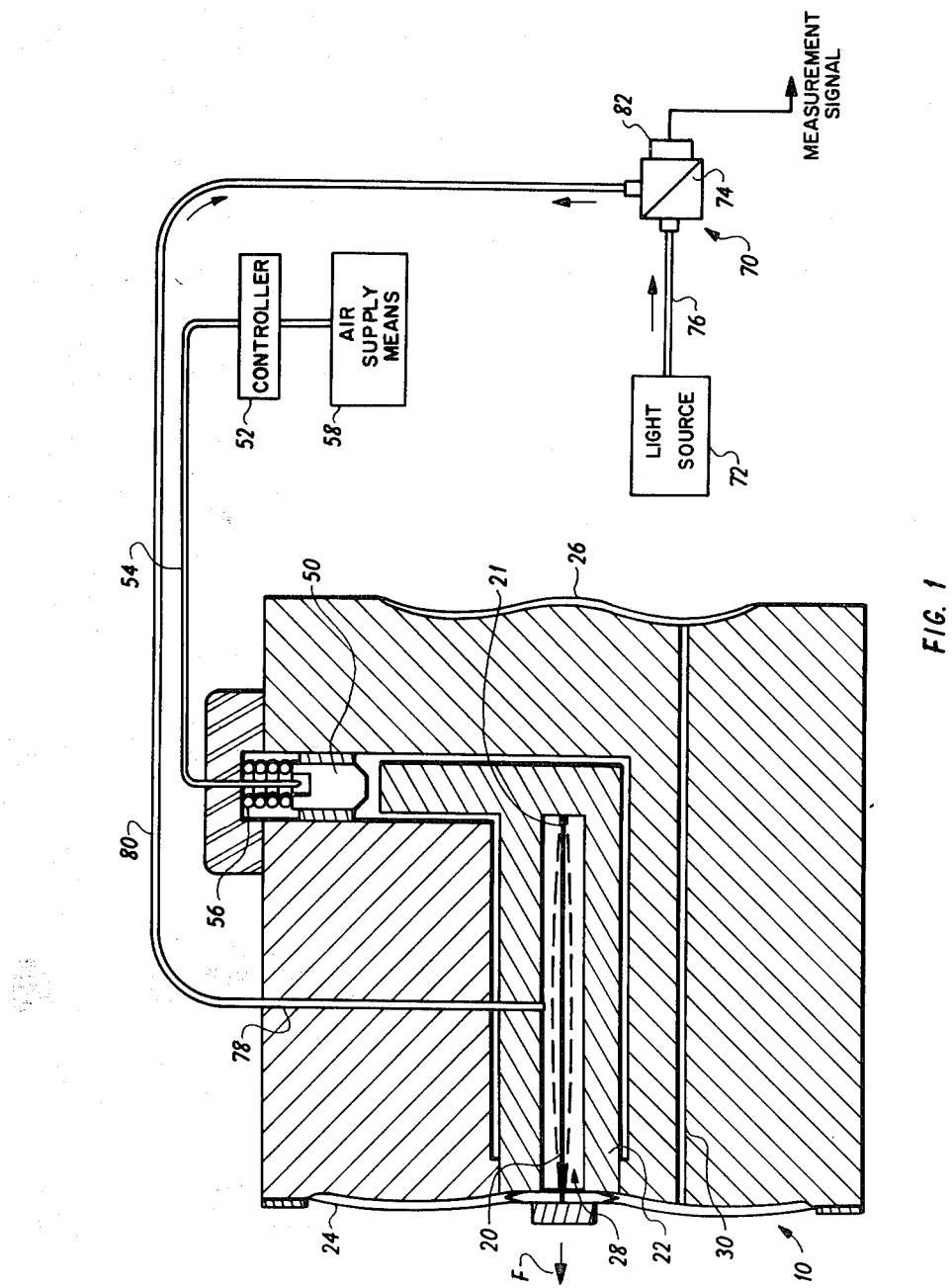
FIG. 1 presents a sectional plan view of one embodiment of the present invention which is incorporated in a vibrating-wire measuring instrument.

With reference to FIG. 1 there is shown a portion of a resonant-wire instrument 10 which incorporates one embodiment of the present invention. Vibratable wire 20 is mounted such that one end 21 is rigidly attached to a housing 22. The other wire end is attached to a movable diaphragm 24 known in the art as a range diaphragm. Diaphragm 26 on the right-hand side of instrument 10 is essentially a slack diaphragm. Wire 20 is disposed in cavity 28 which is formed in housing 22. Conduit 30 connects the reservoirs behind diaphragms 24 and 26 and a fill fluid (not shown) fills the sealed volume defined by cavity 28, conduit 30 and the two reservoirs.

As is well known, pressure is an important physical variable describing the state of a controlled process. The combination of the two diaphragms permits instrument 10 to be used as a differential-pressure measuring device. When a net differential pressure is sensed by instrument 10, a force F is produced which will move diaphragm 24 to the left and thereby put wire 20 in tension. The magnitude of the tension force will affect the resonant frequency of wire 20. The present invention is an apparatus for exciting wire 20 into vibratory motion while it is being tensioned by the force corresponding to the differential pressure.

A reciprocating, pneumatically-driven piston 50 is coupled to a controller 52 by a pipe 54. Controller 52 is connected to a high-pressure air-supply means 58 and includes conventional hardware for permitting short bursts of high-pressure air to be applied into pipe 54. Piston 50, being slidably mounted to instrument 10 and held in rest position above housing 22 by return spring 56, responds to each air burst by impacting momentarily housing 22 to produce a force impulse. Housing 22 is formed to transmit the force impulse so that it is applied to wire end 21 in a direction transverse to the longitudinal axis of wire 20. Accordingly, wire end 21 is moved suddenly with an initial displacement that causes wire 20 to ring at a resonant frequency which is related to the tension in the wire. Since the intensity of the ringing will decay over time, controller 52 is arranged so that the air bursts are applied periodically into pipe 54. The frequency of air bursts is only that which is necessary for providing a prescribed instrument response time and does not have to be proportional to the resonant frequency of the wire.

It should be understood that the device for producing the force impulse is not necessarily limited to this pneumatically-driven piston arrangement because other devices such as an electrically-driven solenoid can also be used. The vibrational frequency of wire 20 is measured by optical detection means 70. A detailed teaching of such detection means is given in the aforementioned Gilby et al patent application. However, briefly described, optical detection means 70 includes a steady-state light source 72, a beam splitter 74 coupled thereto by optical cable 76, a fiber optic detection cable 78 that is sealably passed through instrument 10 such that one end is closely adjacent but not contacting vibrating wire 20, an optical cable 80 connecting detection cable 78 to beam splitter 74, and an optical-to-electrical converter circuit 82 also coupled to beam splitter 74. Light produced by source 72 is transmitted via cable 76 to beam splitter 74. Thereafter, a portion of the light is carried via cables 80 and 78 and applied to vibrating wire 20. Light reflected from wire 20 is picked up by the input portion of cable 78 and transmitted back through cable 80 to beam splitter 74 for application to converter circuit 82. It should be explained that the amount of light being reflected from the vibrating wire changes in accordance with the frequency of the wire vibration. In other words, since the distance between the input end of detection cable 78 and wire 20 is changing as the wire is vibrating laterally back and forth, the amount of reflected light impinging on the open cross section of the input end changes and thus varies in intensity in accordance with the wire vibrational frequency. Circuit 82 is a photodiode that is responsive to the intensity changes of the reflected light to produce an analog electrical signal which is depicted in FIG. 1 as the measurement signal.

Figure 2:
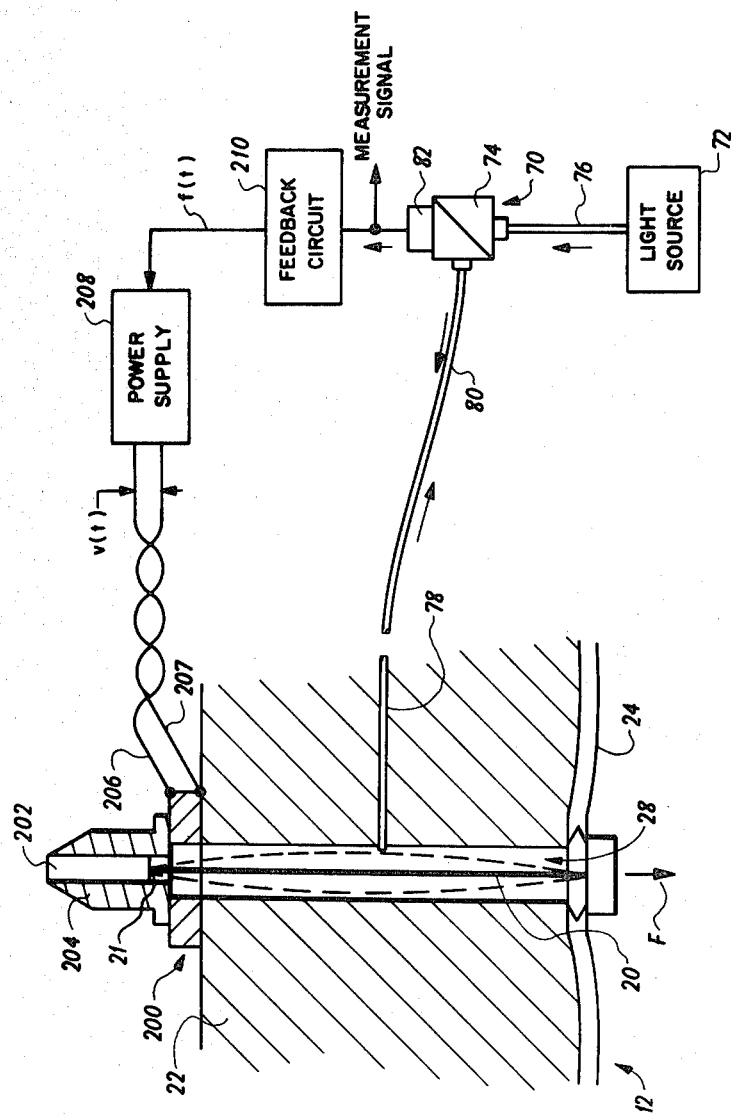
FIG. 2 is a sectional plan view depicting a second embodiment of the present invention incorporated in a vibrating-wire measuring instrument.

With reference to FIG. 2, there is shown a second embodiment of the present invention incorporated in a pressure-measuring device 12 which produces a measurement signal similar to that produced by instrument 10 when both instruments are subjected to the same differential pressure. Although vibrating wire 20 is now depicted with a vertical orientation, such orientation is only for ease of illustration and explanation. As in FIG. 1, range diaphragm 24 is connected to one end of wire 20 and applies a tension force F which corresponds to the differential pressure being sensed by device 12. The slack diaphragm of device 12 is not shown. However, in contrast to the above described first embodiment, the second embodiment includes a piezoelectric shear crystal 200 coupled to wire end 21 that is opposite the end coupled to the range diaphragm. Wire 20 is rigidly attached to pin 202 which is enclosed by end cap 204. End cap 204 is bonded to the top portion of crystal 200. The bottom portion of crystal 200 is bonded to a stationary housing portion of instrument 12. Electrical leads 206 and 207 are connected respectively to the top and bottom surfaces of crystal 200.

Crystal 200 is formed so that a voltage pulse having short duration and high intensity when applied to leads 206 and 207 causes crystal 200 to be sheared laterally for the duration of the pulse. In other words, the top portion of the crystal is moved momentarily in a direction parallel with respect the bottom face of the crystal. Since the bottom face is stationarily bonded to the housing of instrument 12, the top portion along with the wire end 21 are both moved suddenly over to one side and shortly thereafter returned to the rest position when the voltage pulse has ended. This sudden lateral movement will excite wire 20 to ring at the resonant frequency corresponding to the tension being applied to the wire.

In order to keep wire 20 ringing, voltage pulses should be applied periodically to crystal 200. However, instead of using periodically-generated voltage pulses, FIG. 2 depicts another and more preferred method to maintain wire 20 in resonant motion with substantially no decay in vibration intensity. Power supply 208 of conventional design is connected to leads 206 and 207 for supplying a varying-polarity electrical voltage signal v(t) to the crystal. Crystal 200 responds to this voltage signal by oscillating laterally back and forth with respect to the longitudinal axis of wire 20. The lateral oscillations serve to keep wire 20 in vibratory resonant motion. Feedback circuit 210 is a voltage-to-frequency circuit which receives the measurement signal and operates to convert that signal into a signal f(t) that has a frequency corresponding to the detected vibrational frequency of wire 20. Optical detection means 70 (previously described) is used to detect the vibrational frequency of wire 20 as it is being tensioned. Frequency signal f(t) produced by circuit 210 is applied to the power supply 208 which converts it into the voltage signal v(t) that is transmitted to crystal 200 for keeping wire 20 vibrating at its resonant frequency.

FIG. 3 depicts one species of the above-mentioned second embodiment of the present invention wherein crystal 200 is formed in a stacked and oriented arrangement comprising bonded crystal layers 250A through 250D. Electrical lead 206 is connected to nodes 260A through 260C and electrical lead 207 is connected to nodes 270A and 270B. This connection arrangement insures that proper polarity voltages can be applied to the surfaces of crystal layers 250A through 250D so that the direction of shear movement of each succeeding layer adds to one another. The layer arrangement of the crystal has been found to displace wire end 21 further than the displacement produced by a crystal formed with only one layer having a thickness equal to the total thickness of the stacked arrangement. As discussed previously, power supply 208 which is controlled by feedback circuit 210 supplies a varying electrical voltage to crystal 200 via the leads 206 and 207 for exciting wire 20 into vibratory motion.

FIG. 3 also depicts an alternative means for detecting the vibrational frequency of wire 20. It is well known that shear crystal 200 when being sheared by a physical force will produce an electrical signal. Therefore, after wire 20 is excited into vibratory motion, crystal 200 is induced by this motion to generate an electrical signal which has a frequency that varies in accordance with the vibrational frequency of the wire. Detection circuit 209 is connected to leads 206 and 207 and produces the measurement signal in response to the signal generated by crystal 200. Circuitry which may be adapted for use in circuit 209 is disclosed in the aforementioned Olsen et al patent.

FIG. 4 shows a second species of the second embodiment wherein a piezoelectric crystal 300 is formed in a bimorph arrangement. Wire 20 is rigidly attached between crystal layers 302 and 304 which in turn are bonded to cap 310. Layers 302 and 304 are formed so that in response to a voltage pulse applied to leads 206 and 207 one crystal layer will become longer by contracting in thickness while the other crystal layer will become shorter by increasing in thickness. As a result, crystal 300 will become curved and will thereby move wire end 21 connected thereto in a direction transverse to the longitudinal axis of wire 20. In order that proper polarity voltages are applied to the surfaces of crystal layers 302 and 304, lead 206 is connected to nodes 312 and 314 and lead 207 is connected to node 316. Cap 310 is stationarily bonded to a portion of instrument 12 and serves as a fixed base for crystal 300. It should be understood that wire 20 can be made to ring by the application of a short-duration high-intensity voltage pulse to leads 206 and 207. Wire 20 can also be maintained in resonant vibratory motion by the use of a prescribed alternating-polarity voltage signal such as produced by supply 208 in conjunction with feedback circuit 210 which are both shown in FIG. 3. Finally, either optical detection means 70 (shown in FIGS. 1 and 2) or detection circuit 209 (shown in FIG. 3) may be used in conjunction with this second species to produce the measurement signal representative of the physical variable being measured.

While the invention has been described with reference to specific embodiments, it will be apparent that improvements and modifications may be made within the purview of the invention without departing from the true spirit and scope thereof as defined in the appended claims.

We claim:

1. In an instrument of the type for developing a measurement signal which is derived from the frequency of a vibratable means that is tensioned along a longitudinal axis in accordance with the magnitude of a physical variable being measured, an apparatus comprising:
   a stationary housing;
   a base mounted on said housing;
   said vibratable means including one end which is rigidly attached to said base; and
   mechanical-impulsing means connected to said housing for contacting momentarily said base to produce a force which dislaces said one end in a direction transverse to said longitudinal axis,
      whereby said vibratable means is excited into vibratory motion.

2. The apparatus of claim 1 further comprising means for controlling said impulsing means such that said force is applied periodically to said vibratable means.

3. The apparatus of claim 1 further comprising means for sensing optically the frequency of motion of said vibratable means and transforming said frequency into said measurement signal.

4. The apparatus of claim 3 further comprising means for controlling said impulsing means such that said force is applied periodically to said vibratable means.

5. In an instrument wherein a measurement signal is derived from the frequency of a vibratable means that is tensioned along a longitudinal axis with a force proportional to the intensity of a physical variable being measured, an apparatus comprising:
   a base;
   piezoelectric crystal means attached to said base;
   said vibratable means including one end that is connected to a portion of said crystal means;
   voltage means connected to said crystal means for applying thereto a momentary electric field so that said portion of the crystal means and said one end of the vibratable means both displace momentarily in a direction transverse to said longitudinal axis, whereby said vibratable means is excited into vibratory motion;
   means for controlling said voltage means such that said electric field alternates polarity; and
   feedback circuit means having an input coupled to receive said measurement signal and an output coupled to said voltage control means, said feedback circuit means being responsive to said measurement signal to produce a control signal for controlling said voltage control means so that the rate of change of field polarity varies in accordance with changes in the resonant frequency of said vibratable means.

6. The apparatus of claim 5 further comprising means for sensing optically the frequency of motion of said vibratable means and transforming said frequency into said measurement signal.

7. The apparatus of claim 5 wherein said crystal means produces a back-voltage signal in response to the vibrations of said vibratable means; and said apparatus further comprises circuit means coupled to said crystal means for transforming said back-voltage signal into said measurement signal.

8. The apparatus of claim 5 wherein said crystal means includes oriented crystal layers disposed transversely to said longitudinal axis and formed in a stacked arrangement.

9. The apparatus of claim 8 wherein said crystal means produces a back-voltage signal in response to the vibrations of said vibratable means; and said apparatus further comprises circuit means coupled to said crystal means for transforming said back-voltage signal into said measurement signal.

10. The apparatus of claim 5 wherein said crystal means is formed with at least two crystals arranged in a bimorph configuration.

11. The apparatus of claim 10 wherein said crystal means produces a back-voltage signal in response to the vibrations of said vibratable means; and said apparatus further comprises circuit means coupled to said crystal means for transforming said back-voltage signal into said measurement signal.

12. In an instrument wherein a measurement signal is derived from the frequency of a vibratable means that is tensioned along a longitudinal axis with a force proportional to the intensity of a physical variable being measured, an apparatus comprising:
a base;
piezoelectric crystal means attached to said base, said crystal means including oriented crystal layers disposed transversely to said longitudinal axis and formed in a stacked arrangement;
said vibratable means including one end that is connected to a portion of said crystal means; and
voltage means connected to said crystal means for applying thereto a momentary electric field so that said portion of the crystal means and said one end of the vibratable means both displace momentarily in a direction transverse to said longitudinal axis, whereby said vibratable means is excited into vibratory motion.

* * * * *